United States Patent
Daw et al.

(10) Patent No.: US 11,923,097 B2
(45) Date of Patent: Mar. 5, 2024

(54) SENSORS FOR PASSIVELY MEASURING A MAXIMUM TEMPERATURE OF A NUCLEAR REACTOR, AND RELATED METHODS

(71) Applicants: Battelle Energy Alliance, LLC, Idaho Falls, ID (US); Boise State University, Boise, ID (US)

(72) Inventors: Joshua Daw, Idaho Falls, ID (US); Troy C. Unruh, Idaho Falls, ID (US); Brenden J. Heidrich, Idaho Falls, ID (US); David H. Hurley, Idaho Falls, ID (US); Kiyo Tiffany Fujimoto, Meridian, ID (US); David Estrada, Boise, ID (US); Michael McMurtrey, Idaho Falls, ID (US); Kunal Mondal, Idaho Falls, ID (US); Lance Hone, Idaho Falls, ID (US); Robert D. Seifert, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 25 days.

(21) Appl. No.: 17/303,633

(22) Filed: Jun. 3, 2021

(65) Prior Publication Data
US 2021/0398698 A1    Dec. 23, 2021

Related U.S. Application Data

(60) Provisional application No. 63/040,702, filed on Jun. 18, 2020.

(51) Int. Cl.
G21C 17/112    (2006.01)
G01K 11/06    (2006.01)

(52) U.S. Cl.
CPC .......... *G21C 17/112* (2013.01); *G01K 11/06* (2013.01)

(58) Field of Classification Search
CPC ........ G21C 17/112; G01K 11/06; G01K 5/06; G01K 5/62; G01K 5/64; G01K 1/24; G01K 5/66
See application file for complete search history.

(56) References Cited

U.S. PATENT DOCUMENTS

| 1,790,303 A | 1/1931 | Gosselin |
| 3,389,714 A | 6/1968 | Hughes et al. |
| (Continued) | | |

FOREIGN PATENT DOCUMENTS

GB    1143844    2/1967

OTHER PUBLICATIONS

Davis, K L, Knudson, D, Daw, J, Palmer, J, and Rempe, J L. Melt Wire Sensors Available to Determine Peak Temperatures in ATR Irradiation Testing. United States: N. p., 2012. Web.*

(Continued)

*Primary Examiner* — Lily C Garner
(74) *Attorney, Agent, or Firm* — TraskBritt (57) ABSTRACT

A sensor for passively measuring a maximum temperature within a nuclear reactor comprises a substrate, and a plurality of melt wires within a cavity defined within the substrate, at least one melt wire of the plurality of melt wires exhibiting a variable melting temperature along a length of the at least one melt wire. Related sensors and methods of forming the sensors are also disclosed.

24 Claims, 6 Drawing Sheets

(56) References Cited

U.S. PATENT DOCUMENTS

| | | | | |
|---|---|---|---|---|
| 3,527,098 | A | * | 9/1970 | Salgado .................. G01K 11/08 65/59.27 |
| 3,957,460 | A | | 5/1976 | Lee |
| 4,101,295 | A | | 7/1978 | Sadler |
| 4,126,000 | A | | 11/1978 | Funk |
| 4,166,802 | A | | 9/1979 | Slater et al. |
| 4,211,540 | A | | 7/1980 | Netzer |
| 4,211,590 | A | | 7/1980 | Steward et al. |
| 4,284,416 | A | | 8/1981 | Nahas |
| 4,388,267 | A | * | 6/1983 | Tokarz .................. G21C 17/112 374/E11.006 |
| 4,390,291 | A | | 6/1983 | Gaven et al. |
| 4,563,196 | A | | 1/1986 | Jurgen |
| 4,594,140 | A | | 6/1986 | Cheng |
| 4,595,396 | A | | 6/1986 | Erdman |
| 4,602,483 | A | | 7/1986 | Wilks et al. |
| 4,625,056 | A | | 11/1986 | Graham et al. |
| 4,636,224 | A | | 1/1987 | Dilling |
| 4,663,931 | A | | 5/1987 | Schiffers et al. |
| 4,665,688 | A | | 5/1987 | Schiffers et al. |
| 4,704,136 | A | | 11/1987 | Weston et al. |
| 4,720,557 | A | | 1/1988 | Erdman |
| 4,765,781 | A | | 8/1988 | Wilks et al. |
| 4,839,030 | A | | 6/1989 | Comolli et al. |
| 4,977,745 | A | | 12/1990 | Heichberger |
| 5,087,269 | A | | 2/1992 | Cha et al. |
| 5,321,946 | A | | 6/1994 | Abdelmalek |
| 5,403,569 | A | | 4/1995 | Abdelmalek |
| 5,421,166 | A | | 6/1995 | Allam et al. |
| 5,427,762 | A | | 6/1995 | Steinberg et al. |
| 5,607,011 | A | | 3/1997 | Abdelmalek |
| 5,937,652 | A | | 8/1999 | Abdelmalek |
| 6,196,479 | B1 | | 3/2001 | Edlinger |
| 6,997,965 | B2 | | 2/2006 | Katayama |
| 7,253,740 | B2 | * | 8/2007 | Cain ..................... G01K 3/14 374/E11.006 |
| 9,922,737 | B1 | | 3/2018 | Fero et al. |
| 11,150,143 | B2 | * | 10/2021 | Skifton .................. G01K 11/02 |
| 2001/0054256 | A1 | | 12/2001 | Katayama |
| 2006/0258132 | A1 | * | 11/2006 | Brown ................... B82Y 10/00 257/E21.585 |
| 2012/0027045 | A1 | * | 2/2012 | Mclellan .................. G01K 3/04 374/161 |
| 2021/0398698 | A1 | * | 12/2021 | Daw .................... G21C 17/112 |

OTHER PUBLICATIONS

Mondal, K., Fujimoto, K. & McMurtrey, M.D. Advanced Manufacturing of Printed Melt Wire Chips for Cheap, Compact Passive In-Pile Temperature Sensors. JOM 72, 4196-4201 (2020). https://doi.org/10.1007/s11837-020-04426-8 (Year: 2020).*

Fujimoto, Kiyo T., and Michael D. McMurtrey. Development of Bismuth and Platinum Bi-Metallic Nanoparticles to Enhance Melt Wire Temperature Resolution. No. INL/EXT-21-63525-Rev000. Idaho National Lab.(INL), Idaho Falls, ID (United States), 2021. (Year: 2021).*

Kiyo Fujimoto et al. "Material and Design Optimization of Printed Melt Wire Arrays." Nov. 2022. Summary Report-M4CT-22IN0702073. https://inldigitallibrary.inl.gov/sites/sti/sti/Sort_64597.pdf (Year: 2022).*

Daw, J. E., et al. "Temperature monitoring options available at the Idaho national laboratory advanced test reactor." AIP Conference Proceedings. vol. 1552. No. 1. American Institute of Physics, 2013. (Year: 2013).*

Hone, Lance A., et al. Design optimization for Printed Melt Wire Arrays Encapsulation. No. INL/EXT-21-63886-Rev000. Idaho National Lab.(INL), Idaho Falls, ID (United States), 2021. (Year: 2021).*

Der Garabedian, Nicholas Alexander, Kiyo T. Fujimoto, and Kennalee Orme. Bi-metallic Nanoparticle Synthesis for Advanced Manufactured Melt Wires. No. INL/RPT-22-68098-Rev000. Idaho National Lab.(INL), Idaho Falls, ID (United States), 2022. (Year: 2022).*

Davis et al., "Melt Wire Sensors Available to Determine Peak Temperatures in ATR Irradiation Testing," INL/CON-11-23913, Preprint, INL Ladho National Laboratory, (Jul. 2012), 9 pages.

Hallbert et al., "In-Pile Instrumentation Initiative: A Multidisciplinary Scientific Approach for Characterizing Fuels and Materials," INL Ladho National Laboratory, (Oct. 18, 2017), 14 pages.

Salgado et al., "Grooved Melt Wires for Temperature Measurement of Reactor Fuel," (1970), pp. 330-349.

Wadhwa, "Run-time Ink Stability in Pneumatic Aerosol Jet Printing Using a Split Stream Solvent Add Back System," RIT Scholar Works, (Mar. 18, 2015), 59 pages.

Wilkinson et al., "A review of aerosol jet printing—a non-traditional hybrid process for micro-manufacturing," The International Journal of Advanced Manufacturing Technology, vol. 105, (2019), pp. 4599-4619.

* cited by examiner

SENSORS FOR PASSIVELY MEASURING A MAXIMUM TEMPERATURE OF A NUCLEAR REACTOR, AND RELATED METHODS

CROSS-REFERENCE TO RELATED APPLICATION

This application claims the benefit of U.S. Provisional Patent Application Ser. No. 63/040,702, filed Jun. 18, 2020, and entitled "MELT WIRE ARRAYS FABRICATED USING ADDITIVE MANUFACTURING METHODS," the disclosure of which is hereby incorporated herein in its entirety by this reference.

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

FIELD

Embodiments of the disclosure relate generally to melt wires for passively measuring a maximum temperature within a reactor. More particularly, embodiments of the disclosure relate to sensors comprising melt wires formed by additive manufacturing and exhibiting spatial resolution of melting temperatures to determine a maximum temperature of a nuclear reactor, and to related methods.

BACKGROUND

Operation of a nuclear reactor requires control of various conditions within the nuclear reactor including, for example, the pressure, temperature, thermal conductivity, neutron flux, density, localized heating, and geometry of one or more components. In-pile (i.e., within the reactor core or in-situ) irradiation testing of nuclear reactors is used to gain insight into a range of radiation-induced phenomena and understand the performance of fuels and materials in reactor environments. The understanding of irradiation within the nuclear reactor is critical for the assessment of potential materials for a nuclear reactor (e.g., nuclear reactor fuels) to ensure safety and reliability of operation of the nuclear reactor. However, the environment within the nuclear reactor is harsh and presents challenges for determining the conditions within the reactor.

Temperature is a key parameter to be monitored within a nuclear reactor. The temperature within the reactor core (e.g., the temperature of fuel rods, fuel pellets, or nuclear fuels) may provide an indication of the operating conditions of the nuclear reactor. For example, the temperature of the nuclear fuel and the cladding material may be an indication of the fuel integrity. Excessive temperatures of the nuclear fuel, a heat transfer fluid, the cladding material, or other components within the reactor core may result in damage to one or more materials within the reactor core. In addition to the temperature of the fuel materials, temperature monitoring may be used to determine the temperature of the reactor vessel, one or more coolant systems, or other components of the nuclear reactor system.

Temperature monitoring within a nuclear reactor may be performed through both passive and active monitoring techniques. Active temperature monitoring may be performed with, temperature sensors, such as, for example, thermocouples, solid-state thermistors, or ultrasound temperature (UT) monitors placed within the reactor core at one or more locations at which temperature measurement is desired. The temperature sensors may provide real-time data, but are typically expensive to install in a reactor core because they require instrumentation leads. In addition, many active high temperature thermocouples are subject to de-calibration (drift) when exposed to neutron radiation in the reactor core increasing the difficulty of measuring the real-time temperature profiles of reactor fuel materials.

In nuclear research irradiations, some tests are performed without real time sensors, such as by using passive monitoring techniques. For example, melt wire capsules are used to estimate maximum irradiation temperatures by evaluating (during post irradiation examination (PIE)) whether or not a melt wire melted. Currently, up to 5 melt wires can be placed in a single capsule. This yields some level of temperature monitoring, but the manufacturing process is difficult and time consuming and evaluating the wires during PIE is not easy. The passive temperature monitoring may be used in instances where it is difficult or impossible to include instrumentation leads and an associated instrumentation feedthrough passing through portions of the reactor core or wherein use of instrumentation leads and a feedthrough are not cost effective.

BRIEF SUMMARY

In accordance with one embodiment described herein, a sensor for passively measuring a maximum temperature within a nuclear reactor comprises a substrate, and a plurality of melt wires within a cavity defined within the substrate, at least one melt wire of the plurality of melt wires exhibiting a variable melting temperature along a length of the at least one melt wire.

In additional embodiments, a method of forming a sensor for passively measuring a maximum temperature within a nuclear reactor comprises disposing a substrate defining a cavity on a table of an additive manufacturing tool, disposing nanoparticles of one or more materials within the cavity of the substrate to form a melt wire exhibiting a variable melting temperature along a length of the melt wire, and attaching a cover over the cavity.

In further embodiments, a sensor for passively measuring a maximum temperature within a nuclear reactor comprises a substrate, melt wires within a cavity of the substrate, the melt wires exhibiting a different melting temperature, at least one melt wire of the melt wires comprising an alloy of two or more elements, and a cover overlying the substrate and covering the cavity.

In yet additional embodiments, a method of determining a maximum temperature within a nuclear reactor core comprises placing a sensor within a nuclear reactor core and imaging the sensor with x-ray computed tomography to determine a maximum temperature within the nuclear reactor core. The sensor comprises a substrate and a plurality of melt wires on a surface of the substrate, at least one melt wire of the plurality of melt wires exhibiting a variable melting temperature along a dimension of the at least one melt wire.

DETAILED DESCRIPTION

The following description provides specific details, such as material types, dimensions, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional fabrication techniques employed in the industry. In addition, the description provided below does not form a complete process flow, apparatus, or system for forming a structure (e.g., a sensor including one or more melt wires, a melt wire capsule) using additive manufacturing. Only those process acts and structures necessary to understand the embodiments of the disclosure are described in detail below. Additional acts to form a final structure including the materials and methods described herein may be performed by conventional techniques. Also note, any drawings accompanying the present application are for illustrative purposes only, and are thus not drawn to scale. Additionally, elements common between figures may retain the same numerical designation.

According to embodiments described herein, a melt wire array is fabricated through additive manufacturing processes. The melt wire array may facilitate replacement of conventional melt wire capsules used to estimate irradiation test temperatures with a more easily analyzed version with increased temperature and spatial resolution.

As used herein, the term "spatial resolution" means and includes the ability to tune (e.g., control) one or more properties of a material depending on, for example, a particular location within the material. For example, the spatial resolution of a melt wire may mean and include the control of a composition of the melt wire based on a particular location (e.g., along a length) of the melt wire.

Temperature and spatial resolution of the melt wires of the melt wire array may be achieved through additive manufacturing processes to form (e.g., print) melt wires of controlled graded composition onto a substrate. The graded compositions allow for control over the melting temperatures of the melt wires of the melt wire array and a level of spatial resolution for the temperature measurement. In some embodiments, one or more melt wires of the melt wire array comprises a platinum/bismuth alloy exhibiting a wide range of melting temperatures depending on the weight percent of each of platinum and bismuth in the melt wires. Evaluation of the melt arrays can be made electrically by incorporating printed pins into the substrate between adjacent wires and measuring the resistance between them, through visual inspection, or with micro-focus X-ray computed tomography inspection.

In some embodiments, metallic lines of graded composition (with varied melting temperatures) are printed onto a substrate in such a way as to provide spatial resolution of melting temperatures and fine control over the melting point of the printed alloys. In some embodiments, multiple lines of metal (multiple melt wires) are printed onto a ceramic or metallic substrate to form a melt wire array comprising melt wires exhibiting variable melting temperatures.

According to methods described herein, a sensor (also referred to herein as a "melt wire array") for passively measuring a maximum temperature reached within a nuclear reactor (e.g., a nuclear reactor core) includes one or more melt wires, each formulated and configured to melt at a particular temperature or within a particular temperature range. The sensor may include a substrate on which the one or more melt wires is formed, at least some (e.g., each) of the melt wires exhibiting a different melting temperature or a range of melting temperature than at least others of the melt wires. The melt wires may be formed by additive manufacturing (e.g., aerosol jet printing) to each exhibit a desired geometry (length, width, height, shape) and composition, facilitating control of the melting temperature of the melt wires. The melt wires may each individually include one or more materials that are compatible with nuclear reactors (e.g., exhibiting a relatively low neutron absorption cross section). The melt wires may individually comprise an element or an alloy of two or more elements. In some embodiments, two or more (e.g., each of the) melt wires of the sensor comprises the same two or more elements, but comprise a different composition than the other melt wires of the sensor (e.g., a different weight percent of two or more elements of the melt wire). In some embodiments, at least one melt wire may exhibit a variable (e.g., varying) melting point along a dimension (e.g., a length) thereof. The at least one melt wire may exhibit a variable composition along a dimension (e.g., length) thereof, a variable geometry along a dimension (e.g., length) thereof, or both. The sensor may include a cover that is attached to (e.g., welded to) the substrate to enclose the melt wires within a cavity defined by the substrate and the cover. In some embodiments, the cavity is substantially free of oxygen such that surfaces of the melt wires are not oxidized during use and operation of the sensor.

Forming the melt wires by additive manufacturing may facilitate forming the melt wires to have a desired melting temperature and melting temperature profile along a dimension thereof. The additive manufacturing techniques may facilitate formation of melt wires exhibiting desired geometries and compositions. For example, the additive manufacturing techniques may be used to tailor the composition of a particular melt wire in one or more directions (e.g., along the length of the melt wire), such as by changing the feed materials provided to one or more deposition nozzles of the additive manufacturing tool.

The sensor including the melt wires may be deployed in, for example, a nuclear reactor core (e.g., proximate a fuel pin) where it is desired to know whether one or more temperatures were exceeded proximate the sensor during the operation of the nuclear reactor core. The sensor may be a passive sensor in that the sensor is not electrically coupled to an instrumentation lead or structure that is used to provide real-time monitoring of the temperature. The melt wires may be inspected (e.g., after the reactor is shut down) to determine whether one or more temperatures proximate the sensor were exceeded while the reactor was operating. In some embodiments, the maximum temperature proximate the sensor reached during operation of the reactor may be determined based on the particular melt wire(s) that were melted, portions of a particular melt wire that are melted compared to other portions of the particular melt wire that are not melted, or both.

Figure 1A:
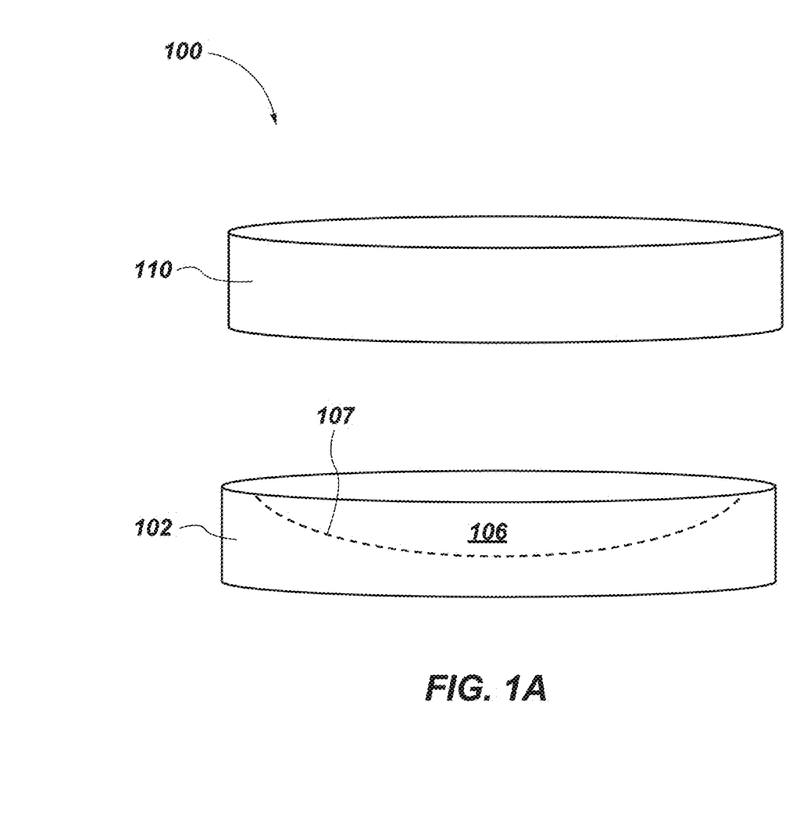
FIG. 1A is a simplified exploded cross-sectional view of a sensor for determining whether one or more temperatures has been reached, according to embodiments of the disclosure.

FIG. 1A is a simplified exploded cross-sectional view of a sensor 100 for determining whether one or more temperatures has been reached, according to embodiments of the disclosure. The sensor 100 may be configured to be located within, for example, a nuclear reactor vessel, a nuclear reactor coolant system, adjacent to a moderator material within the nuclear reactor core, adjacent to one or more control rods, or within or adjacent to any other portion of a nuclear reactor system. In some embodiments, the sensor 100 may be located between adjacent fuel rods of a nuclear reactor core. In some embodiments, the nuclear reactor system may include a conventional pressurized water reactor (PWR), boiling water reactor (BWR), a liquid metal cooled reactor, a gas cooled reactor, a Magnox nuclear reactor, an advanced gas-cooled reactor, a Canada Deuterium Uranium (CANDU) reactor, or a graphite-moderated (e.g., RBMK) reactor system.

The sensor 100 may include a substrate 102 including a recessed portion 104 (FIG. 1B) defining a cavity 106. The cavity 106 may be spaced from outer edges of the substrate 102 by flat portions 112 (FIG. 1B) defining a region between the outer edge of the substrate 102 and the outer portion (e.g., the radially outer portion) of the cavity 106. A cover 110 may be configured to overlie at least a portion of the substrate 102 and enclose the cavity 106. The substrate 102 may exhibit a substantially circular cross-sectional shape, a rectangular cross-sectional shape, a square cross-sectional shape, an elliptical cross-sectional shape, or another cross-sectional shape. In some embodiments, the substrate 102 may exhibit a cylindrical shape and a substantially circular cross-sectional shape. In other embodiments, the substrate 102 may comprise a prismatic shape, a cube shape, a rectangular prism, or another shape. However, the disclosure is not so limited and the shape of the substrate 102 may be different than those described.

In some embodiments, the cavity 106 comprises an arcuate (e.g., curved) surface 107. In some such embodiments, the cavity 106 may exhibit a bowl- or a dish-shape defined by the arcuate surface 107. However, the disclosure is not so limited and in other embodiments, the cavity 106 may exhibit a prismatic shape exhibiting a rectangular cross-sectional shape.

The substrate 102 may comprise one or both of a metal and a ceramic material. By way of non-limiting example, the substrate 102 may be formed of and include, for example, one or more of an elemental metal (e.g., elemental niobium, elemental molybdenum, elemental titanium), a ceramic material (e.g., one or more of sapphire (e.g., α-$Al_2O_3$ including trace amounts of one or more of iron, titanium, chromium, vanadium, and magnesium), alumina ($Al_2O_3$), silicon dioxide ($SiO_2$)), glass, stainless steel (e.g., 316 stainless steel (including, for example, from about 16.0 weight percent to about 18.5 weight percent chromium, from about 10 weight percent to about 14.0 weight percent nickel, from about 2.0 weight percent to about 3.0 weight percent molybdenum, less than about 2.0 weight percent manganese, less than about 0.08 weight percent carbon, less than about 0.75 weight percent silicon, less than about 0.045 weight percent phosphorus, less than about 0.03 weight percent sulfur, less than about 0.10 weight percent nitrogen, the remainder comprising iron), 304 stainless steel (including, for example, from about 18.0 weight percent to about 20.0 weight percent chromium, from about 8.0 weight percent to about 10.5 weight percent nickel, less than about 0.08 weight percent carbon, less than about 2.0 weight percent manganese, less than about 0.045 weight percent phosphorus, less than about 0.030 weight percent sulfur, less than about 0.75 weight percent silicon, less than about 0.10 weight percent nitrogen, the remainder comprising iron)), titanium, zircaloy (an alloy of zirconium, tin, and other metals, such as Zircaloy-2, Zircaloy-4, or Zr-2.5Nb), or another material that is compatible within a nuclear reactor core (e.g., exhibiting a relatively low neutron absorption cross section). In some embodiments, the substrate 102 comprises silicon dioxide. In other embodiments, the substrate 102 comprises alumina.

The cover 110 may comprise one or more of the materials described above with reference to the substrate 102. In some embodiments, the cover 110 comprises substantially the same material composition as the substrate 102. In other embodiments, the cover 110 comprises a different material than the substrate 102.

Figure 1B:
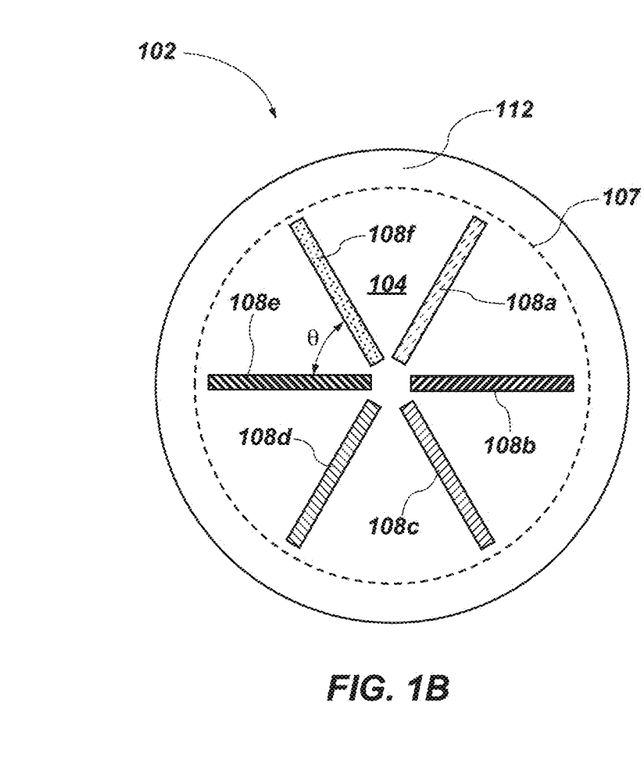
FIG. 1B is a simplified top view of a substrate of the sensor of FIG. 1A, in accordance with embodiments of the disclosure.

FIG. 1B is a simplified top view of the substrate 102. The sensor 100 includes a plurality of melt wires 108a, 108b, 108c, 108d, 108e, and 108f (collectively referred to herein as "melt wires 108") on the substrate 102. The melt wires 108 are not illustrated in FIG. 1A for clarity and ease of understanding of the current description, but it will be understood that the melt wires 108 are located on a surface of the substrate 102 and within the cavity 106.

As will be described herein, the melt wires 108 may be formed on the substrate 102 by additive manufacturing techniques, facilitating formation of melt wires 108 exhibiting a desired melting temperature and melting temperature profile. For example, forming the melt wires 108 by additive manufacturing techniques may facilitate formation of melt wires 108 exhibiting a graded composition, allowing for spatial resolution of melting temperatures of the melt wires 108. In some embodiments, different melt wires 108 may be fabricated to exhibit a different melting temperature than other melt wires 108 of the sensor 100. In addition, in some embodiments, a particular melt wire 108 may be fabricated to exhibit a variable melting temperature such that different portions of the particular melt wire 108 exhibit a different melting temperature. In other words, the melt wire 108 may exhibit a varying melting temperature along at least one dimension (e.g., a length) thereof.

Although FIG. 1B illustrates that the sensor 100 includes six melt wires 108 on the substrate 102, the disclosure is not so limited. In other embodiments, the sensor 100 may include fewer than six melt wires 108 (e.g., five, four, three, two, one), or the sensor 100 may include a greater number of melt wires 108 (e.g., more than eight, more than ten, more than twelve, more than fifteen).

In some embodiments, the melt wires 108 may be spaced from each other at a substantially equal angular spacing. For example, an angle θ between adjacent melt wires 108 may be about 60°. In other words, a longitudinal axis of a melt wire 108 may be oriented at an angle of about 60° from a longitudinal axis of a neighboring melt wire 108. In other embodiments, the angle θ may be about 15°, about 20°, about 30°, about 45°, about 90°, or about 180°. In some embodiments, the angle θ between adjacent melt wires 108 may be substantially the same. In other embodiments, the angle θ between some adjacent melt wires 108 may be different than the angle between other adjacent melt wires 108.

In some embodiments, each of the melt wires 108 may be formulated and configured to exhibit a melting temperature different from a melting temperature of the other melt wires 108. In some embodiments, each melt wire 108 may exhibit a substantially uniform composition and may exhibit a substantially uniform melting temperature along one or more dimensions (e.g., a length) of the melt wire 108. One or more of the composition of the melt wires 108, the composition of the substrate 102, the geometry (e.g., shape) of the melt wires 108, the cross-sectional shape (e.g., diameter, height, width), and the cross-sectional area of the melt wires 108 may be tailored to adjust the melting temperature of the melt wires 108. As will be described herein, in other embodiments, one or more (e.g., two, three, four, all of) the melt wires 108 may be formulated and configured to exhibiting a variable melting temperature along a length thereof.

The melt wires 108 may each have a length (e.g., in the radial direction of the substrate 102), within a range from about 500 μm to about 5.0 cm, such as from about 500 μm to about 750 μm, from about 750 μm to about 1.0 mm, from about 1.0 mm to about 2.0 mm, from about 2.0 mm to about 5.0 mm, from about 5.0 mm to about 1.0 cm, from about 1.0 cm to about 2.0 cm, or from about 2.0 cm to about 5.0 cm. However, the disclosure is not so limited and the length of the melt wires 108 may be different than those described.

In some embodiments, each of the melt wires 108 may have substantially the same length. In other embodiments, at least one of the melt wires 108 may have a length that is different than at least one other of the melt wires 108.

The melt wires 108 may each have a width (e.g., a feature width) within a range from about 20 μm to about 1,000 μm, such as from about 20 μm to about 50 μm, from about 50 μm to about 100 μm, from about 100 μm to about 200 μm, from about 200 μm to about 400 μm, from about 400 μm to about 600 μm, from about 600 μm to about 800 μm, or from about 800 μm to about 1,000 μm. In some embodiments, each of the melt wires 108 may have substantially the same width. In other embodiments, at least one of the wires 108 may have a width that is different than at least one other of the melt wires 108. In some embodiments, one or more of the melt wires 108 may exhibit a variable width along a length thereof. By way of non-limiting example, in some embodiments, a width of one or more melt wires 108 may increase with an increasing distance from a center of the substrate 102.

As will be described herein, the width of the melt wires 108 may be based, at least partially, on an additive manufacturing tool used to fabricate (e.g., additively manufacture, print) the melt wires 108 on the substrate 102.

The melt wires 108 may each have a height extending above the substrate 102 (e.g., in a direction into and out of the page in the view of FIG. 1B) within a range from about 50 nm to about 1.0 mm, such as from about 50 nm to about 100 nm, from about 100 nm to about 200 nm, from about 200 nm to about 500 nm, from about 500 nm to about 1 μm, from about 1 μm to about 10 μm, from about 10 μm to about 50 μm, from about 50 μm to about 100 μm, from about 100 μm to about 500 μm, or from about 500 μm to about 1.0 mm (1,000 μm). However, the disclosure is not so limited and the height of the melt wires 108 may be different than those described. In some embodiments, the melt wires 108 may each individually include at least a portion that extends above an uppermost surface of the substrate 102. In some such embodiments, the melt wires 108 may extend from a surface defining the cavity 106 (e.g., from the arcuate surface 107) vertically above an interface between the substrate 102 and the cover 110.

In some embodiments, each melt wire 108 may exhibit a substantially uniform shape. In some embodiments, at least one melt wire 108 may be configured as a shape (e.g., a cross-sectional shape) that is different than a corresponding shape of at least another of the melt wires 108. By way of non-limiting example, in some embodiments, the at least one melt wire 108 may comprise substantially the same material composition as at least another melt wire 108, but may exhibit a different shape than the at least another melt wire 108. The at least one melt-wire 108 may exhibit a different width, height, or length than the at least another melt wire 108. In some such embodiments, the at least one melt wire 108 and the at least another melt wire 108 may exhibit a different melting temperature.

In other embodiments, at least one of the melt wires 108 may exhibit a variable shape along a dimension (e.g., a length) thereof. For example, a width of the at least one melt wire 108 may vary along a length thereof. In some embodiments, at least one melt wire 108 may exhibit a variable width and a variable height along a length thereof. In some such embodiments, the width and height of the at least one melt wire 108 may decrease in substantially the same direction along the length of the at least one melt wire 108 such that a mass of the at least one melt wire 108 decreases along the length thereof. In some embodiments, a cross-sectional area of the at least one melt wire 108 may vary along a length of the at least one melt wire 108. The melting temperature of the at least one melt wire 108 may be at least partially dependent on the width and height of the at least one melt wire 108.

The melt wires 108 may each be formed of and include a material exhibiting a relatively low neutron cross-section such that the melt wires 108 do not substantially absorb neutrons in the nuclear reactor and substantially reduce a fission rate within the nuclear reactor (e.g., of nuclear fuel materials proximate the sensor 100).

In some embodiments, each melt wire 108 may exhibit a different material composition than the other melt wires 108 such that each melt wire 108 exhibits a different melting temperature than the other melt wires 108. The melt wires 108 may each comprise an elemental material (e.g., an elemental metal), an alloy of two or more elements (e.g., two or more metals), or another material. In some embodiments, each of the melt wires 108 comprises an elemental metal that is different than an elemental metal of the other melt wires 108. In other embodiments, at least some of the melt wires 108 comprise an elemental metal and at least others of the melt wires 108 comprise an alloy of two or more elements.

In some embodiments, each of the melt wires 108 exhibits a substantially uniform composition. In other words, the chemical composition of the melt wires 108 is homogeneous along a dimension (e.g., length) thereof. In other embodiments, one or more of (e.g., each of) the melt wires 108 exhibits a gradient composition along a dimension (e.g., length) thereof. In other words, the chemical composition of the melt wires 108 is heterogeneous along a dimension (e.g., length) thereof. In some such embodiments, the one or more melt wires 108 may each individually exhibit a variable melting temperature along the length thereof. In some embodiments, some of the melt wires 108 exhibit a substantially uniform composition along a dimension (e.g., length)

thereof while others of the melt wires 108 exhibit a variable composition along a dimension (e.g., length) thereof.

As will be described herein, the melting temperature of the melt wires 108 may individually be dependent on one or more of the cross-sectional area of the melt wire 108, the cross-sectional shape (e.g., height, width, diameter) of the melt wire 108, the geometry of the melt wire 108, and the composition of the melt wire 108. The melting temperature of the melt wires 108 may be within a range from about 29.76° C. (the melting temperature of gallium) to about 2,623° C. (the melting temperature of molybdenum), such as within a range from about 29.76° C. to about 50° C., from about 50° C. to about 100° C., from about 100° C. to about 200° C., from about 200° C. to about 300° C., from about 300° C. to about 500° C., from about 500° C. to about 750° C., from about 750° C. to about 1,000° C., from about 1,000° C. to about 1,250° C., from about 1,250° C. to about 1,500° C., from about 1,500° C. to about 2,000° C., or from about 2,000° C. to about 2,623° C.

In some embodiments, a melting temperature of one or more of the melt wires 108 (e.g., two or more of the melt wires 108, each of the melt wires 108) may increase with a radial distance from the center of the substrate 102 to the melt wire 108. In other words, the melting temperature of the melt wire 108 may increase in a direction towards circumference of the substrate 102 (e.g., towards the flat portions 112 of the substrate 102). In other embodiments, the melting temperature of each melt wire 108 may decrease in a direction towards the circumference of the substrate 102.

In some embodiments, a difference between the lowest melting temperature and the highest melting temperature of the melt wires 108 of the sensor 100 may be within a range from about 2° C. to about 100° C., such as from about 2° C. to about 5° C., from about 5° C. to about 10° C., from about 10° C. to about 20° C., from about 20° C. to about 40° C., from about 40° C. to about 60° C., from about 60° C. to about 80° C., or from about 80° C. to about 100° C. In some embodiments, the difference may be about 5° C. In some embodiments, the difference between the lowest melting temperature and the highest melting temperature of the melt wires 108 may be less than about 5° C. However, the disclosure is not so limited and the range of melting temperatures of the melt wires 108 within a particular sensor 100 may be different than those described depending on the operating conditions of the nuclear reactor.

In some embodiments, one or more of the melt wires 108 (e.g., exhibiting a variable composition along a length thereof) may individually exhibit a melting temperature spanning a range from about 2° C. to about 20° C., such as from about 2° C. to about 5° C., from about 5° C. to about 10° C., from about 10° C. to about 15° C., or from about 15° C. to about 20° C. In some embodiments, the melting temperature may span less than about 5° C. In some embodiments, the melting temperature of the one or more melt wires 108 may individually span about 5° C.

The melt wires 108 may each individually include one or more of gallium, indium, tin, bismuth, lead, zinc, tellurium, antimony, aluminum, germanium, silver, gold, copper, manganese, beryllium, nickel, iron, palladium, titanium, platinum, zirconium, rhodium, niobium, and molybdenum. In some embodiments, each melt wire 108 consists essentially of the metal. In other words, in some such embodiments, each melt wire 108 is formed of and includes a single metal element. In some embodiments, the melt wires 108 may individually comprise an alloy of two or more metals and may each exhibit a melting temperature different than a melting temperature of the other melt wires 108. In some embodiments, at least one of the melt wires 108 may comprise the same elements as at least one other of the melt wires 108, but may include a different composition (e.g., weight percent) of two or more elements of the at least one other melt wire 108.

As described above, in some embodiments, one or more of the melt wires 108 may exhibit a gradient in melting temperature along a dimension (e.g., length) thereof. The gradient in the melting temperature of the melt wire 108 may be imparted by varying one or more of a composition and a shape (e.g., a width, a height) of the melt wire 108 along the dimension (e.g., length) thereof. For example, in some embodiments, a melt wire 108 comprising an alloy of two elements may exhibit a melting point between a melting temperature of the element having the lower melting temperature and the melting temperature of the element having the higher melting temperature, the melting temperature at a particular location dependent upon the weight percent of the two elements at the particular location.

In some embodiments, one or more of the melt wires 108 comprises an alloy including two or more elements. In some embodiments, the melt wires 108 comprise an alloy of the two or more elements, each having a different composition (e.g., weight percent) of one or more of the element such that the melt wires 108 each exhibit a different melting temperature. In some embodiments, one or more of the melt wires 108 comprises an alloy of three or more elements.

In some embodiments, each melt wire 108 individually comprises an alloy of bismuth and platinum, each melt wire 108 individually including a different weight percent of each of bismuth and platinum and, thus, exhibiting a different melting temperature. Each melt wire 108 may individually exhibit a substantially uniform melting temperature along a dimension (e.g., length) thereof, and may exhibit a different melting temperature than other melt wires 108 of the sensor 100. In some such embodiments, the melting temperature of the melt wires 108 of the sensor 100 may vary from, for example, the melting temperature of bismuth (271.4° C.) to the melting temperature of platinum (1,768° C.), the melting temperature of each melt wire 108 dependent on the weight percent of bismuth and platinum thereof. By way of non-limiting example, bismuth and platinum may individually constitute from about 0.01 weight percent to about 99.9 weight percent of the melt wire 108, such as from about 0.01 weight percent to about 5 weight percent, from about 5 weight percent to about 10 weight percent, from about 10 weight percent to about 20 weight percent, from about 20 weight percent to about 30 weight percent, from about 30 weight percent to about 40 weight percent, from about 40 weight percent to about 50 weight percent, from about 50 weight percent to about 60 weight percent, from about 60 weight percent to about 70 weight percent, from about 70 weight percent to about 80 weight percent, from about 80 weight percent to about 90 weight percent, or from about 90 weight percent to about 99.9 weight percent of the melt wire 108.

In other embodiments, at least one of the melt wires 108 may exhibit a variable weight percent of bismuth and platinum along a dimension (e.g., length) thereof. For example, in some embodiments, one of the melt wires 108 may include a weight percent of bismuth from about 0.01 weight percent to about 10 weight percent and a weight percent of platinum from about 90 weight percent to about 99.99 weight percent, another melt wire 108 may include a weight percent of bismuth from about 10 weight percent to about 30 weight percent and a weight percent of platinum from about 70 weight percent to about 90 weight percent;

another melt wire 108 may include a weight percent of bismuth from about 30 weight percent to about 50 weight percent and a weight percent of platinum from about 50 weight percent to about 70 weight percent; another melt wire 108 may include a weight percent of bismuth from about 50 weight percent to about 70 weight percent and a weight percent of platinum from about 30 weight percent to about 50 weight percent; another melt wire 108 may include a weight percent of bismuth from about 70 weight percent to about 90 weight percent and a weight percent of platinum from about 10 weight percent to about 30 weight percent; and another melt wire 108 may include a weight percent of bismuth from about 90 weight percent to about 99.99 weight percent and a weight percent of platinum from about 0.01 weight percent to about 10 weight percent. In some embodiments, at least one melt wire 108 may include a weight percent of bismuth ranging from about 0.01 weight percent at a first end to about 99.99 weight percent at a second, opposite end thereof. In some such embodiments, the weight percent of platinum in the at least one melt wire 108 may range from about 99.99 weight percent at the first end to about 0.01 weight percent at the second end.

In some embodiments, at least one of the melt wires 108 comprises an alloy of aluminum, zinc, and tin. At least one of the melt wires 108 may include silver.

In some embodiments, the melt wires 108 comprise a material composition that does not exhibit deep eutectic properties. In other words, the melt wires 108 may comprise alloys exhibiting a relatively linear phase diagram with respect to melting temperature.

In some embodiments, the melt wires 108 may include an alloy of platinum and at least one additional metal. In some embodiments, the melt wires 108 comprise an alloy of platinum and one or both of silver and tin (e.g., AgPt, SnPt, AgSnPt). In other embodiments, the melt wires 108 comprise an alloy of indium and gallium. As discussed above, in some embodiments, the composition of the melt wires 108 (e.g., the weight percent of one or more of platinum, silver, tin, indium, or gallium) may vary along a dimension (e.g., a length) of the melt wire 108.

The melt wires 108 may be formed by additive manufacturing techniques to form the melt wires 108 to exhibit spatial resolution of one or more properties, such as melting temperature. For example, forming the melt wires 108 by additive manufacturing may facilitate forming the melt wires 108 to exhibit a desired melting temperature or a melting temperature profile. As described above, the melt wires 108 may exhibit a variable melting temperature along a dimension (e.g., length) thereof, which may be facilitated by forming the melt wires 108 by additive manufacturing. By way of non-limiting example, additive manufacturing may facilitate forming the melt wires 108 to exhibit a variable composition along a dimension (e.g., length) thereof.

By way of non-limiting example, the melt wires 108 may be formed by one or more of aerosol jet printing (AJP), ink-jet printing (IJP), screen printing, jet printing (e.g., inkjet printing, plasma jet printing), micro-dispense printing (MDP), selective laser sintering (SLS), laser engineered net shaping (LENS), electron beam melting (EBM), VAT polymerization techniques (e.g., stereolithography (SLA) printing), or other additive manufacturing techniques.

Figure 2:
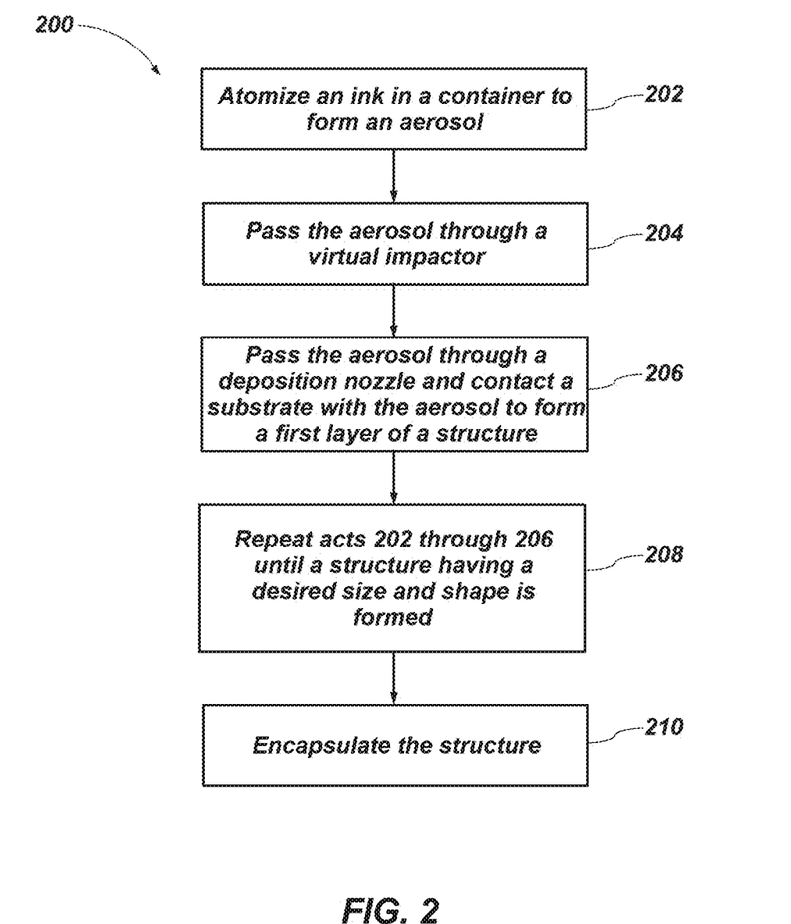
FIG. 2 is a simplified flow diagram illustrating a method of forming a sensor by aerosol jet printing, in accordance with embodiments of the disclosure.

In some embodiments, the melt wires 108 are formed by aerosol jet printing. FIG. 2 is a simplified flow diagram illustrating a method 200 of forming the sensor 100 by aerosol jet printing, in accordance with embodiments of the disclosure. The method 200 includes atomizing an ink in a container to form an aerosol, as indicated at act 202; passing the aerosol through a virtual impactor, as indicated at act 204; passing the aerosol through a deposition nozzle and contacting a substrate with the aerosol to form a first layer of a structure (e.g., the melt wire 108), as indicated at act 206; repeating acts 202 through 206 until a structure having a desired size and shape is formed, as indicated at act 208; and encapsulating the structure, as indicated at act 210.

Figure 3:
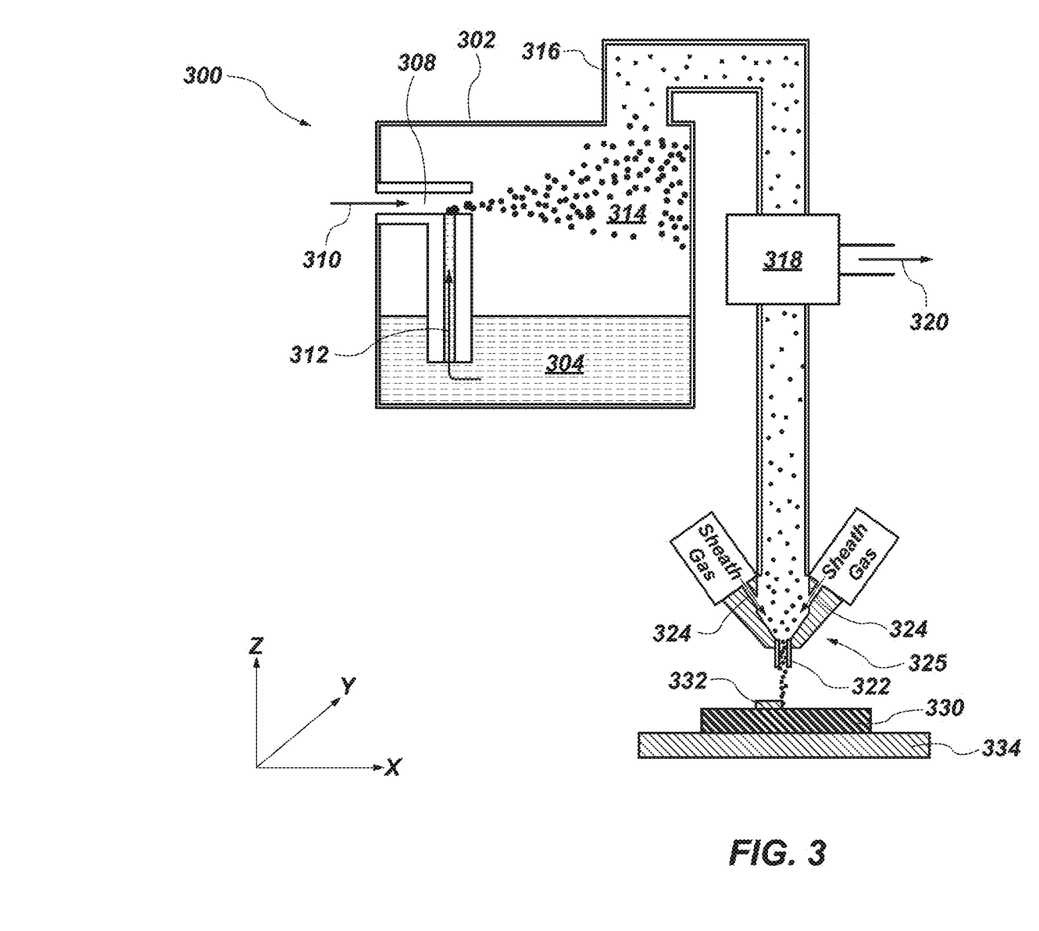
FIG. 3 is a simplified schematic of an aerosol jet printing tool for forming the sensor, in accordance with embodiments of the disclosure.

Act 202 includes atomizing an aerosol jet printing ink in a container of an aerosol jet printing system to form an aerosol comprising the ink. FIG. 3 is a simplified schematic of an aerosol jet printing system 300, in accordance with embodiments of the disclosure. The aerosol jet printing system 300 includes a tank 302 including an ink 304 for printing a structure 332 on a substrate 330. The substrate 330 may correspond to the substrate 102 described above with reference to FIG. 1 and the structure 332 may correspond to the melt wires 108 described above with reference to FIG. 1.

The ink 304 may include one or more of the materials described above with reference to the melt wires 108 (FIG. 1). For example, the ink 304 may include nanoparticles of one or more metals (corresponding to the material composition of the wires 108 described above) dispersed in a solvent. The solvent may include, aqueous solvents, organic solvents, or both. By way of non-limiting example, the solvent may include ethanol (e.g., 200-proof ethanol), ethylene glycol, cyclohexane, isopropyl alcohol, dimethylformamide, dimethylsulfoxide, N-methyl-2-pyrrolidone, polyethylene glycol, diethylene glycol, ethylene glycol, methanol toluene, and one or more additives, such as a wetting and dispersing agent. In some embodiments, the solvent comprises a 1:3 ratio by weight of ethanol to ethylene glycol. However, the disclosure is not so limited and the solvent may include materials other than those described.

The nanoparticles may include one or more of gallium, indium, tin, bismuth, lead, zinc, tellurium, antimony, aluminum, germanium, silver, gold, copper, manganese, beryllium, nickel, iron, palladium, titanium, platinum, zirconium, rhodium, niobium, and molybdenum, as described above with reference to the wires 108. A composition of the nanoparticles within the mixture may correspond to the desired weight percent of the particular elements in the melt wires 108, as described above. In other embodiments, and as will be described herein, in other embodiments, the ink 304 comprises nanoparticles of a single element and may be mixed with one or more additional inks comprising nanoparticles of one or more additional metals to facilitate formation of a wire comprising an alloy.

The nanoparticles may be present in the ink 304 (i.e., the ink 304 may have a loading of the nanoparticles) within a range from about 10 weight percent to about 80 weight percent, such as from about 10 weight percent to about 20 weight percent, from about 20 weight percent to about 30 weight percent, 30 weight percent to about 40 weight percent, from about 40 weight percent to about 50 weight percent, from about 50 weight percent to about 60 weight percent, from about 60 weight percent to about 70 weight percent, or from about 70 weight percent to about 80 weight percent. However, the disclosure is not so limited and the nanoparticles may constitute a different weight percent of the ink 304 than those described. Remaining portions of the ink 304 may include, for example, the solvent and the one or more additives.

The nanoparticles may have a size (e.g., a diameter, length) within a range from about 1 nm to about 1,000 nm, such as from about 1 nm to about 10 nm, from about 10 nm to about 20 nm, from about 20 nm to about 30 nm, from about 30 nm to about 40 nm, from about 40 nm to about 50 nm, 50 nm to about 60 nm, from about 60 nm to about 80 nm, from about 80 nm to about 100 nm, from about 100 nm to about 200 nm, from about 200 nm to about 400 nm, from about 400 nm to about 600 nm, from about 600 nm to about 800 nm, or from about 800 nm to about 1,000 nm. In some embodiments, the nanoparticles have a size within a range from about 95 nm to about 105 nm. In other embodiments, the nanoparticles have a size of about 800 nm. In yet other embodiments, the nanoparticles have a size within a range from about 60 nm to about 80 nm. In further embodiments, the nanoparticles have a size within a range from about 1 nm to about 50 nm.

The size of the nanoparticles may be tailored to adjust the melting temperature of the melt wires 108 formed from the nanoparticles. In some embodiments, the nanoparticles of a material may exhibit a relatively lower melting temperature than a melting temperature of the bulk material. In some embodiments, the nanoparticles of one element of the melt wires 108 may have a different size (e.g., a different mean diameter) than a size of the nanoparticles of other elements of the melt wire 108. In some such embodiments, a melt wire 108 may be formed from nanoparticles of a first element having a different size than nanoparticles of a second element of the melt wire 108.

In some embodiments, the nanoparticles may be coated with one or more passivation materials. The passivation materials may include one or more polymeric materials, polyvinyl alcohol, polyvinyl pyrrolidone (PVP), polyethylene glycol, ethyl cellulose, ethylenediaminetetraacetic acid, thioglycolic acid, oleic acid, and citric acid. By way of non-limiting example, in some embodiments, the nanoparticles are coated with polyvinyl pyrrolidone (PVP).

With continued reference to FIG. 3, the tank 302 may include an atomizer 308 (also referred to as a "pneumatic atomizer") through which an atomizing gas is flowed, as indicated at arrow 310. The atomizing gas may comprise an inert gas, such as, for example, nitrogen. In some embodiments, the atomizing gas is substantially free of oxygen. In use and operation, the atomizing gas is provided to the atomizer 308, which facilitates flow of the ink 304 through a lower portion of the atomizer 308, as indicated at arrow 312, to facilitate atomization of the ink 304 and generation of an aerosol 314 within the tank 302. In some embodiments, the aerosol jet printing system 300 includes an ultrasonic atomizer. In some such embodiments, ultrasonic energy may be provided to the ink 304 in the tank 302 to form the aerosol 314.

In the tank 302, the relatively larger droplets of the aerosol 314 may fall back to the bulk ink 304 while the relatively smaller droplets exit the tank 302 through exit 316. From the exit 316, the aerosol 314 is directed to a virtual impactor 318. With reference to FIG. 2, act 204 includes passing the aerosol through the virtual impactor 318. The virtual impactor 318 may include a vacuum inlet configured to draw a portion of the aerosol 314 through an exhaust 320 to reduce an amount of the aerosol 314 directed to a deposition head 325. As known in the art of aerosol jet printing, the vacuum may be applied perpendicular to the direction of flow of the aerosol 314. The virtual impactor 318 may remove relatively smaller (fine) droplets of the aerosol 314 out of the aerosol stream. Removing the smaller droplets of the aerosol 314 may facilitate a reduction in overspray of the aerosol 314 onto the substrate 330.

With continued reference to FIG. 2 and FIG. 3, act 206 includes passing the aerosol 314 through the deposition head 325 and contacting the substrate 330 with the aerosol 314 to form a first layer of the structure 332. The deposition head 325 may include a deposition nozzle 322 through which the aerosol 314 flows to be directed to the substrate 330 to form the structure 332 on the substrate 330. A sheath gas is flowed through the deposition nozzle 322, as indicated by arrows 324. The sheath gas may be configured to focus the aerosol 314 into the deposition nozzle 322. In some embodiments, the sheath gas is substantially free of oxygen. In some embodiments, the sheath gas comprises nitrogen.

Act 208 may include repeating acts 202 through 206 to form the structure 332 to have the desired size and shape. Acts 202 through 206 may be repeated a desired number of times until the structure 332 has a desired height, for example. In some embodiments, the structure 332 is formed to comprise a single layer, such that the height of structure 332 is from about 50 nm to about 100 nm. The height of the structure 332 may correspond to the height of the melt wires 108 described above.

The substrate 330 may be disposed on a table 334. The deposition nozzle 322 and the associated deposition head 325 may be configured to move in at least the x-direction and the y-direction to deposit the aerosol 314 on the upper surface of the substrate 330 or the structure 332. In some embodiments, the table 334 may be configured to move in the x-direction and the y-direction. The aerosol 314 may be deposited at desired locations on the upper surface of the structure 332.

In some embodiments, the solvent is evaporated from the aerosol 314 upon deposition of the aerosol 314 on the surface of the substrate 330 or the structure 332. In some embodiments, one or more of the table 334 and the substrate 330 are maintained at a temperature within a range from about 20° C. to about 100° C., such as from about 20° C. to about 50° C., or from about 50° C. to about 100° C. In some embodiments, the temperature of the table 334 is maintained at about 65° C.

In some embodiments, after a current layer on the upper surface of the structure 332 is formed, one or both of the structure 332 and the deposition head 325 may be moved relative to each other in the z-direction. For example, the table 334 may be configured to move in the z-direction. In other embodiments, the deposition head 325 may be configured to move in the z-direction. In some embodiments, the table 334 may be configured to move in the z-direction a distance corresponding to a thickness of the previously formed layer of material of the structure 332.

In some embodiments, the aerosol jet printing system 300 may be in operable communication with a processor having associated therewith a memory including instructions configured to direct the deposition head 325 and deposition nozzle 322 to locations where the aerosol 314 should be provided to form the structure 332 having a desired size and shape. By way of nonlimiting example, the memory may include data for formation of a desired structure in the form of a computer-aided-design (CAD) model or a computer-aided-manufacturing (CAM) model configured to direct the deposition head 325, the deposition nozzle 322, and the table 334.

In some embodiments, after forming the structure 332, the structure 332 and substrate 330 may be exposed to annealing conditions to remove excess solvent from the structure 332 and the substrate 330. By way of non-limiting example, the substrate 330 and the structure 332 may be exposed to a temperature within a range from about 150° C. to about 250° C., such as about 200° C. for about one hour to evaporate any excess solvent.

Act 210 includes encapsulating the structure 332. In some embodiments, encapsulating the structure 332 comprises encapsulating the substrate 330, such as by placing a cover over the substrate 330. The cover may correspond to the cover 110 described above with reference to FIG. 1. In some embodiments, the cover is attached to the substrate 330 to encapsulate the melt wires within a cavity between the substrate 330 and the cover, as described above with reference to FIG. 1. The cover may be attached to the substrate 330, such as by welding with, for example, a laser welder.

In some embodiments, the cover (e.g., the cover 110 (FIG. 1A)) may be welded to the substrate 330 to encapsulate the structure 332. In some embodiments, the cover 110 may include an aperture (also referred to as a so-called "weep hole"). After welding the cover to the substrate 330, the substrate 330 and cover 110 may be disposed in an inert atmosphere under a vacuum to remove any gases present between the substrate 330 and the cover 110. In some embodiments, the substrate 330 and cover 110 are exposed to an inert atmosphere (e.g., helium, argon, or both) under pressure to substantially fill the cavity with the inert gases and the aperture may be welded to seal the cavity in the inert atmosphere.

Although the aerosol jet printing system 300 has been described and illustrated as including a single deposition head 325 and deposition nozzle 322, the disclosure is not so limited. In other embodiments, the aerosol jet printing system 300 may include more than one deposition head 325 and/or more than one deposition nozzle 322 to facilitate forming a structure 332 exhibiting a variable composition along a dimension (e.g., height, length) thereof, as described above with reference to the melt wires 108. For example, a first deposition nozzle 322 may be configured to provide an aerosol 314 comprising a first element to the substrate 330 and a second deposition nozzle 322 may be configured to provide an aerosol 314 comprising a second element to the substrate 330. The first deposition nozzle 322 and the second deposition nozzle 322 may be controlled to control a composition of the structure 332.

In use and operation, one or more sensors 100 may be placed at one or more desired locations within a nuclear reactor, such as within the nuclear reactor core. The nuclear reactor may be operated to generate power, to run one or more irradiation tests (e.g., such as where the nuclear reactor comprises a test reactor (such as the advanced test reactor (ATR))), or both. After the nuclear reactor is shut down, the one or more sensors 100 may be inspected to determine whether one or more temperatures were exceeded within the nuclear reactor proximate the location where the one or more sensors 100 were placed. An indication that one or more melt wires 108 melted provides an indication that the melting temperature of the one or more melt wires 108 was exceeded during operation of the nuclear reactor. Similarly, an indication that one or more melt wires 108 have not melted indicates that the melting temperature of such melt wires 108 was not exceeded. The melting temperature profile of the melt wires 108 within the sensor 100 may be selected such that some of the melt wires 108 melt while others of the melt wires 108 do not melt to provide spatial resolution of the maximum temperature reached proximate the sensor 100.

The one or more sensors 100 may be inspected during post-irradiation examination (PIE). The one or more sensors 100 may be inspected visually, with x-ray computed tomography (XCT) (e.g., micro-focus X-ray computed tomography), by incorporating printed pins into the substrate 102 between adjacent melt wires 108 and measuring the resistance between the adjacent melt wires with the printed pins. In some embodiments, the one or more sensors 100 are inspected with X-ray computed tomography. In some embodiments, discontinuities, changes in shape, or changes in size, of the melt wire 108 may provide an indication that the melt wire 108 was exposed to a temperature greater than the melting temperature of the melt wire 108. Accordingly, in some embodiments, a method of determining a maximum temperature within a reactor core includes disposing one or more sensors 100 in the reactor core and imaging (e.g., scanning) the one or more sensors 100 (e.g., the one or more melt wires 108) with x-ray computed tomography to determine locations where the one or more melt wires 108 melted, which may be correlated to a maximum temperature of the reactor core.

Although the sensors 100 of FIG. 1 have been described and illustrated as exhibiting a particular configuration, the disclosure is not so limited. In other embodiments, one or more melt wires 108 may be formed (e.g., printed) onto a structure of a nuclear reactor where it is desired to determine a maximum temperature reached. For example, one or more melt wires 108 may be formed on a surface of a fuel pin (e.g., on cladding) to determine a maximum temperature reached on such surface.

Figure 4A:
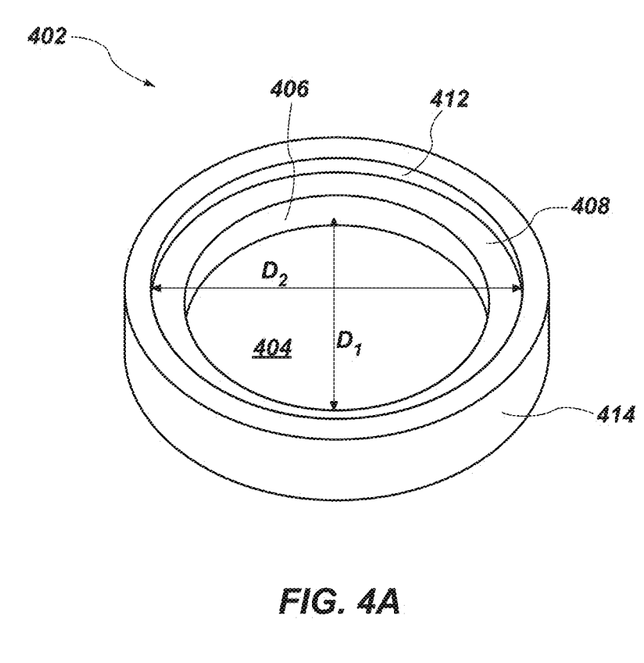
FIG. 4A is a simplified partial perspective view of a substrate of a sensor for determining whether one or more temperatures has been reached, in accordance with additional embodiments of the disclosure.

Although the substrate 102 (FIG. 1A) has been described and illustrated as having a particular configuration including the arcuate surface 107 (FIG. 1A), the disclosure is not so limited. FIG. 4A is a simplified partial perspective view of a substrate 402, in accordance with additional embodiments of the disclosure. The substrate 402 may include a first surface 404 on which, for example, one or more melt wires (e.g., melt wires 108 (FIG. 1B)) may be formed. An inner raised portion 406 may include a second surface 408 on which a cover (e.g., cover 410 (FIG. 4B)) may rest, as will be described herein. The inner raised portion 406 may define a diameter Di of the substrate 402.

Figure 4B:
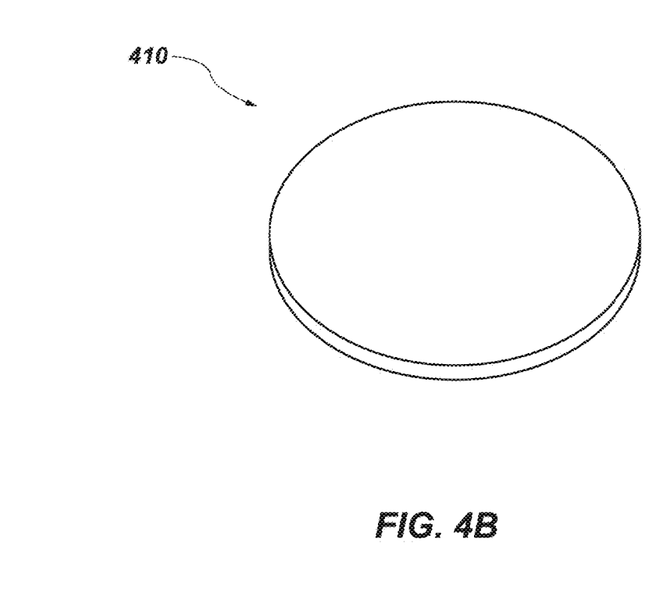
FIG. 4B is a simplified partial perspective view of a cover of the sensor of FIG. 4A, in accordance with additional embodiments of the disclosure.

FIG. 4B is a simplified partial perspective view of a cover 410, in accordance with embodiments of the disclosure. With collective reference to FIG. 4A and FIG. 4B, in some embodiments, the cover 410 may be configured to overlie and contact the second surface 408 of the inner raised portion 406 to form a cavity defined at least by the cover 410, the inner raised portion 406, and the first surface 404. The cavity may encapsulate and enclose the melt wires formed on the first surface 404 of the substrate 402.

The substrate 402 may further include an outer raised portion 412 defining an outer wall 414 of the substrate 402 and defining a diameter Dz. The diameter Da may be substantially the same as a diameter of the cover 410. In some embodiments, the diameter Da is larger than the diameter of the cover 410 such that the cover 410 fits within the diameter Dz. In some such embodiments, the cover 410 may be configured to overlie the second surface 408 to define the cavity. In some embodiments, the cover 410 may be welded to the substrate 402 to seal the enclosure.

Figure 5:
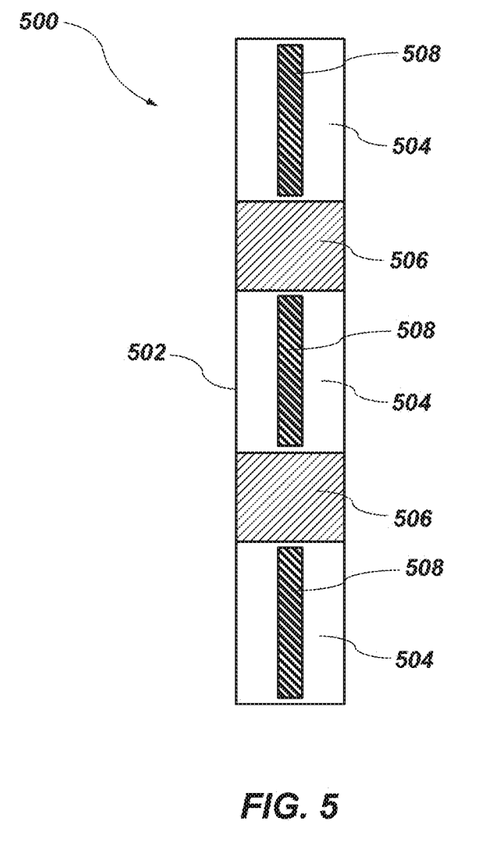
FIG. 5 is a simplified cross-sectional view of a sensor for measuring a maximum temperature, in accordance with embodiments of the disclosure.

In other embodiments, a sensor may include one or more melt wires disposed in a vessel, the melt wires physically separated from one another. FIG. 5 is a simplified cross-sectional view of a sensor 500, in accordance with embodiments of the disclosure. The sensor 500 may include a quartz tube 502 including sections 504 spaced from each other by spacers 506. Each section 504 may include a substrate disposed in the quartz tube 502 and on which a melt wire 508 is disposed. Each section 504 may be physically separated and sealed from other sections 504 by the spacers 506. In some embodiments, the spacers 506 comprise quartz.

The melt wires 508 may be substantially the same as the melt wires 108 described above with reference to FIG. 1B and may exhibit different melting temperatures than the other melt wires 508 of the sensor 500. In some embodiments, at least one of the melt wires 508 exhibits a variable melting temperature along a length thereof.

Accordingly, in some embodiments, forming the melt wires 108 by additive manufacturing may facilitate formation of melt wires 108 exhibiting spatial resolution of melting temperatures. By way of non-limiting example, the melt wires 108 may be fabricated to exhibiting a variable temperature along one or more dimensions thereof, such as by variable one or more of a composition of the melt wire 108 and a geometry of the melt wire 108 along the one or more dimensions. Thus, melt wires may be used to for development of peak temperature profiles in one or more regions of a reactor, such as a nuclear reactor core (e.g., between adjacent fuel pins) without the use of additional instrumentation. Accordingly, the sensors may comprise passive sensors and may be used for passively measuring a maximum temperature within the nuclear reactor (e.g., the nuclear reactor core). The melt wires may passively provide a temperature profile at temperatures approaching that at which fuel rod meltdown would occur.

Example

A melt wire comprising aluminum, a melt wire comprising tin, and a melt wire comprising zinc were fabricated by additive manufacturing with an aerosol jet printing tool. The aluminum melt wire was fabricated with an ink comprising aluminum nanoparticles having a mean diameter of about 800 nm and coated with polyvinylpyrrolidone. The aluminum nanoparticles were mixed with a solvent comprising ethanol and ethylene glycol at a 1:3 ratio to form an ink comprising about 60 weight percent of the aluminum nanoparticles. An ink comprising tin nanoparticles having a mean diameter from about 60 nm to about 80 nm was formed in a similar manner. Similarly, an ink comprising zinc nanoparticles having a mean diameter from about 95 nm to about 105 nm was formed in a similar manner. Melt wires were formed from each of the ink compositions on a substrate comprising silicon dioxide. Following printing of the melt wires, the printing melt wires were sintered at about 200° C. for about 1 hour in a reducing atmosphere to remove any residual solvent. The melt wires were about 2 mm long and had a diameter of about 0.5 mm.

Figure 6:
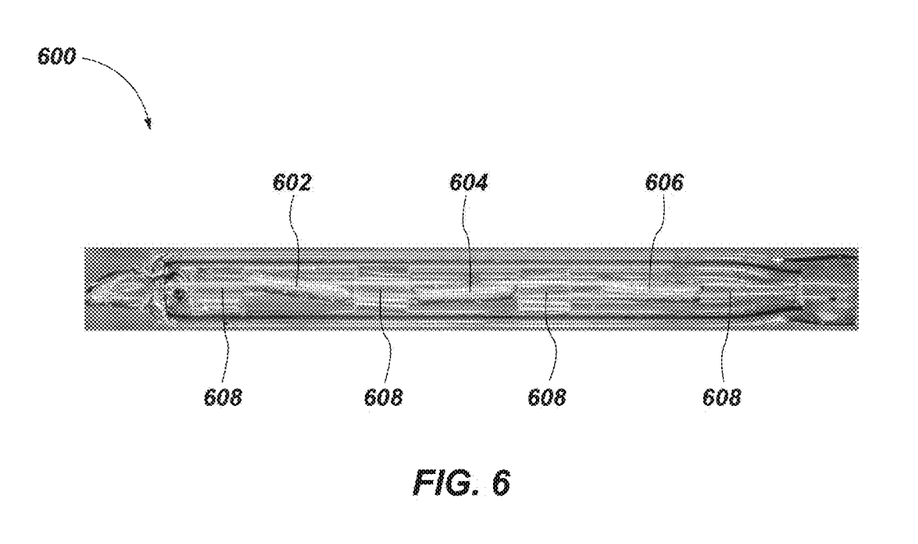
FIG. 6 is a picture of a quartz tube including physically separated melt wires comprising tin, zinc, and aluminum.

The melt wires were sealed in a quartz tube 600, as shown in FIG. 6. The quartz tube 600 included an aluminum melt wire 602, a zinc melt wire 604, and a tin melt wire 606. The melt wires were separated from each other by quartz spacers 608. The melting temperature of the melt wires was determined by differential scanning calorimetry (DSC). The melting temperature of the tin melt wire was determined to be 228.3° C.±0.7° C., the melting temperature of the zinc melt wire was determined to be about 415° C.±1° C., and the melting temperature of the aluminum melt wire was determined to be about 656.5° C.±0.3° C. The difference between the melting temperature of the melt wires and of tin, zinc, and aluminum (231.9° C., 419.5° C., and 660.3° C., respectively) was attributed to impurities within the feedstock materials.

While embodiments of the disclosure may be susceptible to various modifications and alternative forms, specific embodiments have been shown by way of example in the drawings and have been described in detail herein. However, it should be understood that the disclosure is not limited to the particular forms disclosed. Rather, the disclosure encompasses all modifications, variations, combinations, and alternatives falling within the scope of the disclosure as defined by the following appended claims and their legal equivalents.

What is claimed is:

1. A sensor configured for passively measuring a maximum temperature within a nuclear reactor, the sensor comprising:
   a substrate; and
   a plurality of melt wires on a surface of the substrate, at least one melt wire of the plurality of melt wires exhibiting a variable melting temperature along a dimension of the at least one melt wire.

2. The sensor of claim 1, wherein the at least one melt wire comprises an alloy of platinum and bismuth.

3. The sensor of claim 1, wherein the at least one melt wire comprises nanopardcles of at least one of platinum and bismuth.

4. The sensor of claim 1, wherein a weight percent of at least one chemical element of the at least one melt wire varies along the dimension of the at least one melt wire.

5. The sensor of claim 1, wherein one or both of a cross-sectional shape and a cross-sectional area of the at least one melt wire varies along the dimension of the at least one melt wire.

6. The sensor of claim 1, wherein the at least one melt wire comprises an alloy of at least three chemical elements.

7. The sensor of claim 1, wherein the substrate comprises one or more of an elemental metal, sapphire, alumina, glass, quartz, silicon dioxide, stainless steel, titanium, and zircaloy.

8. The sensor of claim 1, wherein each melt wire of the plurality of melt wires exhibits a different melting temperature.

9. The sensor of claim 1, wherein the substrate comprises a metal material or a ceramic material.

10. The sensor of claim 1, wherein the at least one melt wire exhibits a variable melting temperature along a length of the at least one melt wire.

11. The sensor of claim 1, further comprising a cover overlying the substrate and encapsulating the plurality of melt wires.

12. A method of forming a sensor for passively measuring a maximum temperature within a nuclear reactor, the method comprising:
   disposing a substrate on a table of an additive manufacturing tool;
   disposing nanoparticles of one or more materials on a surface of the substrate to form a plurality of melt wires on the surface of the substrate, at least one melt wire of the plurality of melt wires exhibiting a variable melting temperature along a dimension of the at least one melt wire; and
   encapsulating the plurality of melt wires.

13. The method of claim 12, wherein forming a plurality of melt wires, at least one melt wire of the plurality of melt wires exhibiting a variable melting temperature along a dimension of the at least one melt wire comprises forming the at least one melt wire exhibiting a variable composition along a length of the at least one melt wire.

14. The method of claim 12, wherein disposing a substrate on a table of an additive manufacturing tool comprises disposing the substrate on an aerosol jet printing tool.

15. The method of claim 12, wherein disposing nanoparticles of one or more materials on the substrate to form a plurality of melt wires, at least one melt wire of the plurality of melt wires exhibiting a variable melting temperature along a dimension of the at least one melt wire comprises forming the at least one melt wire comprising a variable amount of bismuth along the dimension of the at least one melt wire.

16. The method of claim 12, wherein disposing nanoparticles of one or more materials on the substrate to form a plurality of melt wires, at least one melt wire of the plurality of melt wires exhibiting a variable melting temperature along a dimension of the at least one melt wire comprises forming the at least one melt wire comprising platinum and bismuth.

17. The method of claim 12, wherein forming a plurality of melt wires comprises forming the plurality of melt wires within a cavity defined within the substrate.

18. The method of claim 12, wherein forming a plurality of melt wires, at least one melt wire exhibiting a variable melting temperature along a dimension of the at least one melt wire comprises forming the at least one melt wire to exhibit a lowermost melting temperature of the at least one melt wire within a range from about 2° C. to about 20° C. less than an uppermost melting temperature of the at least one melt wire.

19. The method of claim 12, wherein encapsulating the plurality of melt wires comprises attaching a cover to the substrate and forming a cavity comprising an inert atmosphere and including the plurality of melt wires.

20. A sensor configured for passively measuring a maximum temperature within a nuclear reactor, the sensor comprising:
a substrate;
melt wires on the substrate, at least one melt wire of the melt wires exhibiting a different melting temperature from at least another melt wire, the at least one melt wire comprising an alloy of two or more elements, wherein a weight percent of at least one chemical element of the at least one melt wire varies along at least one dimension of the at least one melt wire; and
a cover overlying the substrate and encapsulating the melt wires.

21. The sensor of claim 20, wherein the at least one melt wire comprises bismuth and platinum.

22. The sensor of claim 20, wherein the at least one melt wire comprises at least three chemical elements.

23. The sensor of claim 20, wherein the at least one melt wire comprises tin, zinc, and aluminum.

24. A method of determining a maximum temperature within a nuclear reactor core, the method comprising:
placing a sensor within a nuclear reactor core, the sensor comprising:
a substrate; and
a plurality of melt wires on a surface of the substrate, at least one melt wire of the plurality of melt wires exhibiting a variable melting temperature along a dimension of the at least one melt wire; and
imaging the sensor with x-ray computed tomography to determine a maximum temperature within the nuclear reactor core.

* * * * *

UNITED STATES PATENT AND TRADEMARK OFFICE
CERTIFICATE OF CORRECTION

| | | |
|---|---|---|
| PATENT NO. | : 11,923,097 B2 | |
| APPLICATION NO. | : 17/303633 | |
| DATED | : March 5, 2024 | |
| INVENTOR(S) | : Joshua Daw et al. | |

It is certified that error appears in the above-identified patent and that said Letters Patent is hereby corrected as shown below:

In the Specification

| | | |
|---|---|---|
| Column 16, | Line 39, | change "diameter Di of the" to --diameter $D_1$ of the-- |
| Column 16, | Line 51, | change "diameter Dz. The" to --diameter $D_2$. The-- |
| Column 16, | Line 51, | change "diameter Da may" to --diameter $D_2$ may-- |
| Column 16, | Line 53, | change "diameter Da is" to --diameter $D_2$ is-- |
| Column 16, | Line 55, | change "diameter Dz. In" to --diameter $D_2$. In-- |

In the Claims

| | | | |
|---|---|---|---|
| Claim 3, | Column 18, | Line 20, | change "comprises nanopardcles of" to --comprises nanoparticles of-- |

Signed and Sealed this
Twenty-fifth Day of June, 2024

Katherine Kelly Vidal
*Director of the United States Patent and Trademark Office*